(12) United States Patent
Halas et al.

(10) Patent No.: US 6,660,381 B2
(45) Date of Patent: Dec. 9, 2003

(54) PARTIAL COVERAGE METAL NANOSHELLS AND METHOD OF MAKING SAME

(75) Inventors: Nancy J. Halas, Houston, TX (US); Robert K. Bradley, Houston, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 10/012,791

(22) Filed: Nov. 5, 2001

(65) Prior Publication Data

US 2002/0160195 A1 Oct. 31, 2002

Related U.S. Application Data

(60) Provisional application No. 60/245,532, filed on Nov. 3, 2000.

(51) Int. Cl.[7] .................................................. B32B 5/16
(52) U.S. Cl. ...................... 428/403; 428/404; 428/405; 428/406; 428/407; 427/123; 427/126.1; 427/222; 427/217; 252/478; 252/518; 252/520; 252/587
(58) Field of Search ................................. 428/403, 404, 428/405, 406, 407; 252/478, 518, 520, 587; 427/123, 126.1, 217, 212

(56) References Cited

U.S. PATENT DOCUMENTS

| | | | |
|---|---|---|---|
| 5,306,522 A | 4/1994 | Clough et al. | 427/126.3 |
| 5,834,069 A | 11/1998 | Berman et al. | 417/553 |
| 5,942,280 A * | 8/1999 | Mathers et al. | |
| 5,989,629 A | 11/1999 | Sacripante et al. | 427/180 |
| 6,033,622 A | 3/2000 | Maruyama | 419/35 |
| 6,235,395 B1 | 5/2001 | Sacripante et al. | 428/403 |
| 6,344,272 B1 * | 2/2002 | Oldenburg et al. | 428/403 |

OTHER PUBLICATIONS

Nakahama et al. A Novel Preparation . . . Technique Langmuir 2000, 16, 7882–7886, Sep. 21, 2000.*
Takei "Gradient Sensitive . . . Latex Spheres" Langmuir Apr. 2, 1997 vol. 13, No. 7, Letters.*
PCT Written Opinion for Appln. No. PCT/US01/46727; Dated Nov. 20, 2002; (pp. 5).
International Search Report for Appln. No. PCT/US01/46727; Dated Jul. 23, 2002; (pp. 5).
P. Jiang, et al.; *Single–Crystal Colloidal Multilayers of Controlled Thickness*; Chem. Mater. 1999, 11, pp. 2132–2140.
S.J. Oldenburg, et al; *Infrared Extinction Properties of Gold Nanoshells*; Applied Physics Letters; vol. 75, No. 19; Nov. 8, 1999; pp. 2897–2899.
K. Nakahama, et al; *A Novel Preparation of Nonsymmetrical Microspheres Using the Langmuir–Blodgett Tecnique*; Langmuir 2000, 16, pp. 7882–7886.
K. C. Grabar, et al; *Kinetic Control of Interparticle Spacing in Au Colloid–Based Surfaces: Rational Nanometer–Scale Architecture*; J. Am. Chem. Soc. 1996, 118, pp. 1148–1153.

(List continued on next page.)

*Primary Examiner*—Leszek Kiliman
(74) *Attorney, Agent, or Firm*—Conley Rose, P.C.

(57) ABSTRACT

Metal Nanoshells having partial coverage of a substrate or core particle and methods of making them are provided. A method of making a partial metal nanoshell preferably includes asymmetrically confining a substrate particle and selectively layering a metallic material over the substrate particle according to the asymmetry. Confining the substrate particle may include attaching it to a support defining an exposed portion and a contact portion. The method may include either chemically modifying the substrate particle. The solid angle of coverage of the partial metal nanoshell may be influenced by the nature of the chemical modification, such as alternatives of activating and passivating the exposed portion.

45 Claims, 7 Drawing Sheets

OTHER PUBLICATIONS

K. C. Grabar, et al; Supplementary Experimental Details to *Kinetic Control of Interparticle Spacing in Au Colloid–Based Surfaces: Rational Nanometer–Scale Architecture*; J. Am. Chem. Soc. 1996, 118, pp. 1148 Graber Supplemental p. 1.

H. Takei, et al.; *Gradient Sensitive Microscopic Probes Prepared by Gold Evaporation and Chemisorption on Latex Spheres*; Langmuir The ACS Journal of Surfaces and Colloids; vol. 13, No. 7, Apr. 2, 1997; pp. 1865–1868.

* cited by examiner

PARTIAL COVERAGE METAL NANOSHELLS AND METHOD OF MAKING SAME

CROSS-REFERENCE TO RELATED APPLICATIONS

This application claims the benefit of U.S. Provisional Application Serial No. 60/245,532, filed Nov. 3, 2000, entitled "Growth Technique for Partial Gold Nanoshells", hereby incorporated herein by reference.

STATEMENT REGARDING FEDERALLY SPONSORED RESEARCH OR DEVELOPMENT

Funding from Office of Naval Research Grant No. N00014-98-1-0393 supported this work.

FIELD OF THE INVENTION

The present invention relates generally to composite particles containing metallic shell layers. More, particularly the present invention relates to particles that include a shell layer that partially covers a substrate particle. The substrate particle may be a core particle or an inner composite particle. Further, the present invention relates to a method for making a composite particle that includes mechanically introducing asymmetry to the particle and forming a partial shell as determined by the asymmetry.

BACKGROUND OF THE INVENTION

Particles able to absorb or scatter light of well-defined colors have been used in applications involving detection, absorption, or scattering of light, for example medical diagnostic imaging. Such particles are typically colloidal metal particles. The term colloidal conventionally refers to the size of the particles, generally denoting particles having a size between about 1 nanometer and about 1 micron.

Small particles made from certain metals that are in the size range of colloidal metal particles tend to have a particularly strong interaction with light, termed a resonance, with a maximum at a well-defined wavelength. Such metals include gold, silver, platinum, and, to a lesser extent, others of the transition metals. Light at the resonance wavelength excites particular collective modes of electrons, termed plasma modes, in the metal. Hence the resonance is termed the plasmon resonance.

By selecting the metal material of a colloidal particle, it possible to vary the wavelength of the plasmon resonance. When the plasmon resonance involves the absorption of light, this gives a solution of absorbing particles a well-defined color, since color depends on the wavelength of light that is absorbed. Solid gold colloidal particles have a characteristic absorption with a maximum at 500–530 nanometers, giving a solution of these particles a characteristic red color. The small variation in the wavelength results from a particle size dependence of the plasmon resonance. Alternatively, solid silver colloidal particles have a characteristic absorption with a maximum at 390–420 nanometers, giving a solution of these particles a characteristic yellow color.

Using small particles of various metals, particles can be made that exhibit absorption or scattering of selected characteristic colors across a visible spectrum. However, a solid metal colloidal particle absorbing in the infrared is not known. Optical extinction, in particular absorption or scattering, in the infrared is desirable for imaging methods that operate in the infrared. Further, optical communications, such as long distance phone service that is transmitted over optical fibers, operate in the infrared.

It has been speculated since the 1950's that it would be theoretically possible to shift the plasmon resonance of a metal to longer wavelengths by forming a shell of that metal around a core particle made of a different material. In particular, the full calculation of scattering from a sphere of arbitrary material was solved by Mie, as described in G. Mie, Ann. Phys. 24, 377 (1908). This solution was extended to concentric spheres of different materials, using simplifying assumptions regarding the dielectric properties of the materials, by Aden and Kerker, as described in A. L. Aden and M. Kerker, J. of Applied Physics, 22, 10, 1242 (1951). The wavelength of the plasmon resonance would depend on the ratio of the thickness of the metal shell to the size, such as diameter of a sphere, of the core. In this manner, the plasmon resonance would be geometrically tunable, such as by varying the thickness of the shell layer. A disadvantage of this approach was its reliance on bulk dielectric properties of the materials. Thus, thin metal shells, with a thickness less than the mean free path of electrons in the shell, were not described.

Despite the theoretical speculation, early efforts to confirm tunability of the plasmon resonance were unsuccessful due to the inability to make a particle having a metal shell on a dielectric core with sufficient precision so as to have well-defined geometrical properties. In these earlier methods, it was difficult to achieve one or both of monodispersity of the dielectric core and a well-defined controllable thickness of a metal shell, both desirable properties for tuning the plasmon resonance. Thus, attempts to produce particles having a plasmon resonance in keeping with theoretical predictions tended to result instead in solutions of those particles having broad, ill-defined absorption spectra. In many instances this was because the methods of making the particles failed to produce smooth uniform metal shells. Rather, the methods tended to produce isotropic, non-uniform shells, for example shells having a bumpy surface.

However, one of the present inventors co-developed a novel method of making coated nanoparticles (particles with a size between about 1 nanometer and about 5 microns) that was successful in producing metal-coated particles having narrow well-defined spectra. Further, one of the present inventors co-discovered that improved agreement with theoretical modeling of the coated nanoparticles resulted from the incorporation in the theory of a non-bulk, size-dependent value of the electron mean free path. That is, improved agreement with theory was achieved by developing an improved theory applicable to thin metal coatings. Thus, in the improved theory a dependence of the width of the plasmon resonance on the thickness of the metal coating was described.

Complete nanoparticle coatings with gold have been demonstrated. Particles having at least one substantially uniform metal coating layer have been termed metal nanoshells. Nanoshell structures that exhibit structural tunability of optical resonance's from the visible into the infrared can currently be fabricated. Gold has the advantage of a strong plasmon resonance that can be tuned by varying the thickness of the coating. More generally, the resonance may be tuned by varying either the core thickness or the thickness of the coating, in turn affecting the ratio of the thickness of the coating to the thickness of the core. This ratio determines the wavelength of the plasmon resonance. A further advantage of gold-coated particles is that they have shown promise as materials with advantages in imaging and diagnostics. In particular, they have utility as band-pass optical filters, impeding the photo-oxidation of conjugated polymers, and in conjunction with sensing devices based on surface enhanced Raman substrates.

However, plasmon resonant particles with enhanced nonlinear optical properties are desirable for applications in, for example, optical mixing and optical modulating. Nonliner optical effects are described as follows. When light of electric field E and oscillation frequency v is incident on a substance, a wave of polarization of the frequency omega. is induced in proportion to the electric field E in the substance. Then, light of the oscillation frequency v originates from the wave of polarization. This is normal interaction of light with a substance, and the incident light is identical in oscillation frequency with the outgoing light. In some particular substances, however, light of electric field E and oscillation frequency v induces considerably intense waves of polarization proportional to $E^n$. Substances of this nature are called nonlinear optical media. These substances show the following peculiar phenomena. They produce light having an oscillation frequency n times as high as the oscillation frequency of the incident light, i.e., the outgoing light shows a color different from that of the incident light. The refractive index of such a nonlinear optical medium may change as a function of the intensity of the light, or the square of the electric field. These are collectively known as nonlinear optical effects. Application of nonlinear optical effects to wavelength conversion of laser radiation and to optical logic devices is well known. One method of obtaining nonlinear optical effects is to introduce asymmetry. Thus, it would be desirable to provide anisiotropic plasmon resonant particles and a method for making them. However, a robust method of partially coating spherical nanoparticles with a controlled "solid angle" of coverage has thus far not been reported.

Further, it would be useful to have a method of making small metal-coated particles with other advantages, such magnetism arising from the metal coating. Small magnetic particles have many applications. Such articles are used as toner in xerography, in ferrofluid vacuum seals, in nuclear magnetic resonance imaging as contrast agents, and in magnetic data storage. These magnetic particles are typically micron-sized in diameter or larger. The large size of these particles renders them less than satisfactory for several specialized applications.

If the magnetic particles were smaller, cost reduction by reducing the number of processing steps would be achieved in xerographic applications. In ferrofluid applications, the enhanced solubility due to carbon coating provided by smaller particles may be advantageous. In magnetic data storage, high density may be enhanced by using smaller particles. Moreover, in magnetic ink applications, the carbon coating and ability to disperse the nanoparticles in aqueous solutions may provide advantages for wetting and coating. Further, there is a need for particles with enhanced magnetic properties, as may arise from asymmetry. Consequently, there is a potential need for anisotropic sub-micron-sized metal, alloy, or metal carbide particles with magnetic properties and a method for making them.

SUMMARY OF THE INVENTION

According to an embodiment, the present invention features an asymmetric nanoparticle that includes a substrate particle and a metallic shell layered on said substrate particle within a solid angle less that 360°. The substrate particle preferably includes a nonmetallic material. The nonmetallic material may be throughout the substrate particle. Alternatively, the nonmetallic material is contained in an outer layer of the substrate particle. The shell includes a metallic material. The metallic material may be selected from among elemental metals, alloys, and synthetic metals. The metallic material may be a plasmon resonant material. Alternatively, or in combination the metallic material may be a magnetic material.

According to an alternative embodiment, the present inventions features a method for making a composite particles that includes asymmetrically confining a substrate particle so as to define a first surface portion and a second surface portion and selectively layering a primary metallic material over either the first surface portion or the second surface portion so as to form a partial metal shell that includes the primary metallic material.

According to yet an alternative embodiment, the present invention features a method for making a composite particle that includes electrophoretically attaching a core particle to a metallized support such that the core particle has an exposed portion and a remaining portion, selectively attaching a plurality of activating agents to either the exposed portion or the remaining portion, depositing a plurality of metal colloids onto the activating agents, reducing additional metal onto the metal colloids so as to form a partial metal shell.

Thus, the present invention comprises a combination of features and advantages which enable it to overcome various problems of prior particles. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Partial Metal Nanoshells

Figure 1:
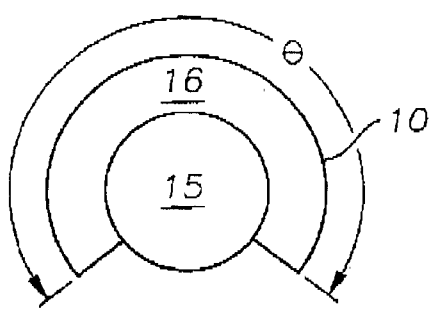
FIG. 1 is a cross-sectional view of a composite particle according to an embodiment of the present invention.
Figure 2:
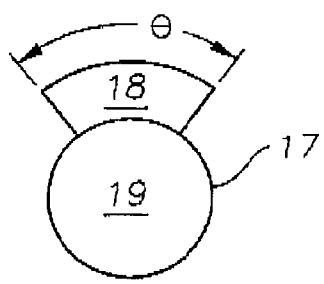
FIG. 2 is a cross-sectional view of a composite particle according to an alternative embodiment of the present invention.

Referring initially to FIG. 1, according to a preferred embodiment of the present invention, a particle 10 includes a core 15 and a shell 16. Particle 10 is preferably a nanoparticle. In particular, particle 10 preferably has a size between about 1 nanometer and about 5 microns. Particle 10 is preferably spherical in shape. Alternatively, particle 10 may have any geometrical shape, such as cubical, cylindrical, hemispherical, elliptical, and the like. The size of particle 10 is preferably defined by the average diameter of particle 10.

The average diameter of an object, such as particle 10, having a surface defining the extent of the object is defined herein as the angular average of the distance between opposing regions of the surface through a fixed point located interior to the object. For an object embedded in three dimensions, described for example by a radial coordinate system centered at the fixed point, the average is over both the radial angle θ and the aziumuthal angle φ. That is, the average diameter <D>of the diameter D(θ, φ) is given by $<D>=(\int d\theta d\phi D(\theta, \phi))/4\pi^2$.

Core 15 is preferably spherical. Alternatively, core 15 may have any geometrical shape, such as cubical, cylindrical, hemispherical, elliptical, and the like. The size of core 15 is preferably defined by the average diameter of core 15. Core 15 preferably has a size between about 1 nanometer and about 5 microns, more preferably between about 10 nanometers and about 4 microns.

Core 15 preferably includes a substrate material. The substrate material is preferably any material that has a smaller dielectric permittivity than preferred materials for shell 16, described further below. The substrate material is preferably a dielectric material. Alternatively, or in combination, core 15 may include a semiconducting material. Further, many dielectric materials are also semiconducting. Suitable substrate materials include silicon dioxide (also termed silica), titanium dioxide, polymethyl methacrylate, polystyrene, gold sulfide cadmium sulfide, cadmium sulfide, gallium arsenide, and the like. Further, suitable substrate materials include dendrimers. In some embodiments, the substrate material extends throughout core 15, such that core 15 primarily contains the substrate material. Alternatively, in some other embodiments, the substrate material is arranged as a surface layer of core 15.

Shell 16 is preferably layered on core 15. In particular, shell 16 preferably primarily extends outwards, for example in a radial direction, from core 15. In some embodiments, the inner surface of shell 16 contacts the outer surface of core 15. The contact between core 15 and shell 16 may occur between portions of core 15 and shell 16. Alternatively, shell 16 and core 15 may be in continuous contact.

Shell 16 preferably includes inner and outer surfaces that each are spheroidal. Alternatively, shell 16 may be defined by inner and outer surfaces where one or both surfaces has an alternative shape, such as cubical, cylindrical, hemispherical, elliptical, and the like. The thickness of shell 16 preferably is defined as the difference between the outer radius and the inner radius, computed by subtracting the inner radius from the outer radius. The inner radius is half the average diameter of the inner surface. Likewise, the outer radius is half the average diameter of the outer surface.

Shell 16 is preferably a partial shell. A partial shell covers a portion of core 15. Thus, the inner and outer surfaces of shell 16 preferably extend over the portion of core 15. The portion covered is preferably extends within a solid angle Θ of coverage less than 360°.

According to one embodiment, particle 17 is termed a nanocup defined by including a shell 18 layered on core 19, where shell 18 is a partial shell extending within a solid angle Θ at least 180° and less than 360°. The solid angle is more preferably between about 300° and about 350°. It will be understood that any other feature described herein of any of particle 10, core 15, and shell 16 not related to solid angle may likewise be a feature of any of particle 17, core 19, and shell 18, respectively.

According to an alternative embodiment, particle 10 is termed a nanocap defined by including a shell 16 that is a partial shell extending within solid angle less than 180°. The solid angle is preferably between about 10° and about 60°.

Shell 16 preferably includes a metallic material. According to some embodiments, the metallic material includes at least one element selected from the Periodic Table of the Elements that are commonly known as metals. The metallic material may include primarily a single element. Alternatively, the metallic material may be a combination of at least two elements, such as an alloy, for example a binary alloy. As used herein, metals include those elements disclosed in the USPTO Manual of Classification as metals. Both the old IUPAC notation, with Roman numerals, and the new notation, with Arabic numbers will be used herein. See, for example Lewis, Richard J., Sr., "Hawley's Condensed Chemical Dictionary" (1997, John Wiley and Sons), the inside front cover page, hereby incorporated herein by reference, for a comparison of notations. In particular, Group I metals include Group 1 metals (Li, Na, K, Rb, Ca, and Fr) and Group 11 metals (Cu, Ag, and Au). Group II metals include Group 2 metals (Be, MG, Ca, Sr, Ba, and Ra) and Group 12 metals (Zn, Cd, and Hg). Group III metals include Group 3 metals (Sc and Y) and Group 13 metals (Al, Ga, In, and Tl). Group IV metals include Group 4 metals (Ti, Zr, and Hf) and Group 14 metals (Ge, Sn, and Pb). Group V metals include Group 5 metals (V, Nb, and Ta) and Group 15 metals (As, Sb, and Bi). Group VI metals include Group 6 metals (Cr, Mo, and W) and Group 16 metals (Po). Group VII metals include Group 7 metals (Mn, To, and Re). Group VIII metals include Group 8 metals (Re, Ru, and Os), Group 9 metals (Co, Rh, and Ir), and Group 10 metals (Ni, Pd, and Pt). A metallic material forming shell 16 preferably is selected from the elements of Groups I and VIII. More preferably, the metallic material is selected from among copper (Cu), silver (Ag), gold (Au), nickel (Ni), platinum (Pt), palladium (Pd), and iron (Fe). Alternatively, in some embodiments, the metallic material includes a synthetic metal. A synthetic metal is defined herein as an organic or organometallic material that has at least one characteristic property in common with a metal. For example, the property may be electrical conductivity. Thus, synthetic metals include conducting polymers, such as polyacetylene, polyanaline, and the like. Therefore, when shell 16 is metallic, shell 16 may include any of an elemental metal, an alloy, a synthetic metal, and combinations thereof.

Referring still to FIG. 1, in some embodiments, an intermediate material (not shown) is disposed between shell 16 and core 15. This intermediate material may have any suitable function.

Figure 3:
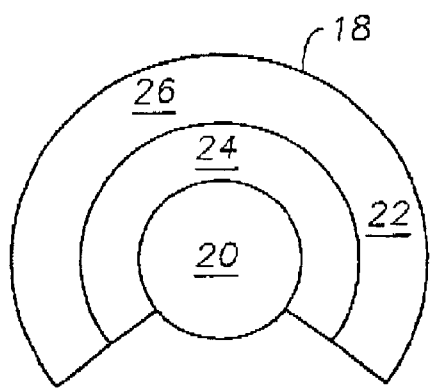
FIG. 3 is a cross-sectional view of a composite particle according to embodiment of the composite particle shown in FIG. 1.

Referring now to FIG. 3, according to an embodiment of the present invention, a composite particle 18 includes a core 20, a metallic shell 22, and an intermediate layer 24. Layer 24 preferably includes a functionalizing material that is adapted to bind to a shell 22. Thus, the presence of the intermediate layer functionalizes the core, allowing a metallic material to be coated directly onto the surface of functionalized core 26 formed by core 20 and layer 24.

According to an embodiment of the present invention, the functionalizing material is a metallic material adapted to receive the primary metallic material forming shell 22, for example by reduction of primary metallic material onto the functionalizing material. The functionalizing material is preferably tin. Alternatively, titanium, which has similar reduction properties to tin, could be used in replacement of tin. A portion of the functionalizing material forming layer 24 is preferably the reaction product of ions of the functionalizing material with hydroxyl groups at the surface of a silica core. Additional functionalizing material forming layer 24 is preferably the reaction product of reduction from solution of additional ions of the functionalizing material onto the functionalizing material bound to the core.

According to an alternative embodiment, the functionalizing material is a nonmetallic material. The nonmetallic material may be selected from among CdS, CdSe, and the like.

According to still an alternative embodiment, intermediate layer 24 includes a plurality of linker molecules. The linker molecules are arranged such that one end of each linker molecule binds to core 15 and the other end of each linker molecule binds to shell 16. Thus, preferably one end of a linker molecule preferably includes a first functional group with an affinity for material contained in core 15 and the other end of the linker molecule preferably includes a second functional group with an affinity for material contained in shell 16. Aminopropylsilanetriol is a linker molecule that is suited to linking a metallic shell to a silica core. Aminopropylsilanetriol is the hydrolyzed form of aminopropyltriethoxysilane (APTES). The silanol groups at one end of aminopropylsilanetriol have an affinity for silica, in particular hydroxyl groups at the surface of silica. Thus, a silanol linkage between core 20 and aminopropylsilanetriol is derived from the reaction of a silanol group of aminopropylsilanetriol with a hydroxyl group on core 20, with elimination of water. An amino group at the other end of aminopropylsilanetriol has an affinity for metallic materials. Thus, an amino linkage between shell 22 and aminopropylsilanetriol is derived from the reaction of aminopropylsilanetriol with shell 22.

It will be understood that alternative linker molecules may be used. For example, the linker molecule may include an end group with an affinity for metallic material that includes an active atomic site that is an element selected from among sulfur and phosphorus, as alternatives to nitrogen. For example, a linker molecule having a nitrogen as an atomic site may be the hydrolyzed form of any suitable amino silane, such as aminopropyltrimethoxy silane, diaminopropyl-diethoxy silane, 4-aminobutyldimethylmethoxy silane, and the like. Further, a linker molecule having a sulfur as an atomic site may be the hydrolyzed form of any suitable thio silane, such as mercaptopropyltrimethoxy silane, and the like.

Figure 4:
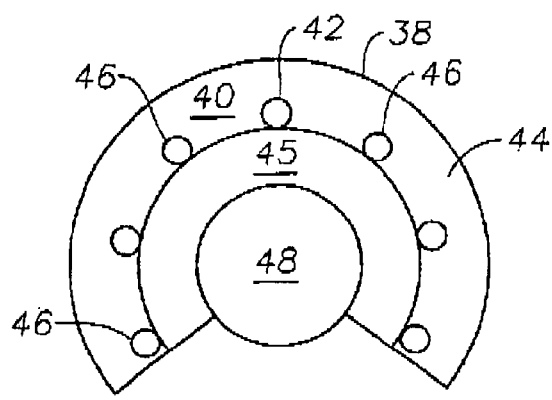
FIG. 4 is a cross-sectional view of a composite particle according to an embodiment of the composite particle shown in FIG. 3.

Referring now to FIG. 4, in some embodiments, a composite particle 38 includes a shell 40 that includes a precursor metallic material 42 that may be different in chemical make-up from a primary metallic material 44 that primarily forms shell 40. Precursor material 42 provides nucleation sites for the formation of shell 40. Precursor material 42 preferably includes colloidal particles 46 distributed over the surface of core 48. Thus, colloidal particles 46 may be embedded as part of shell 40. Colloidal particles 46 preferably are bound to intermediate layer 45. For example, in some embodiments, colloidal particles 46 are bound to linker molecules in intermediate layer 45. Thus, for example, gold colloidal particles may bind to aminopropyl-silanetriol and serve as nucleation sites for a silver shell. Alternatively, tin colloidal particles may extend from an intermediate layer 45 that includes tin. In an exemplary arrangement, as disclosed in U.S. Utility applications Ser. No. 09/966,544, filed September 27 now pending, which is incorporated herein by reference, subparticles were made including gold colloidal precursor particles having a size between about 1 and about 3 nanometers that served as nucleation site for a silver shell having a thickness between about 10 nanometers and about 20 nanometers. It was been observed that, for this arrangement, the plasmon resonance associated with the silver shell was well-described by neglecting the presence of the gold colloids.

Referring again to FIG. 1, in some embodiments, particle 10 has a plasmon resonance associated with shell 16. A plasmon resonance conventionally is a resonant interaction of electromagnetic radiation with collectively coupled electrons. In a conductive metallic material, the electrons that interact are the conduction electrons. A plasmon resonance is preferably detected as a peak in a spectrum. The spectrum may be an absorption spectrum. Alternatively, the spectrum may be a scattering spectrum. Further, the spectrum is preferably visualized as a plot of intensity as a function of wavelength. Intensity may be measured, as is conventional, in arbitrary units. Wavelength may be measured in any suitable units, such as nanometers, microns, and the like. Further, the plot may be a plot of intensity as a function of any other spectroscopic variable, such as wavenumber (e.g. $cm^{-1}$ and the like) and frequency (e.g. mHz and the like). A wavelength $\lambda$, wavenumber n, and frequency v are conventionally related as $\lambda = v_r/v = 1/n$, where $v_r$ is the velocity of propagation of the radiation. For propagation in a vacuum, $v_r = c$, the speed of light. When the spectrum is an absorption spectrum the intensity is the intensity of radiation that is absorbed, such as by particle 10 or a plurality of particles 10. Likewise, when the spectrum is a scattering spectrum the intensity is the intensity of radiation that is scattered, such as by particle 10 or plurality of particles 10.

Figure 5:
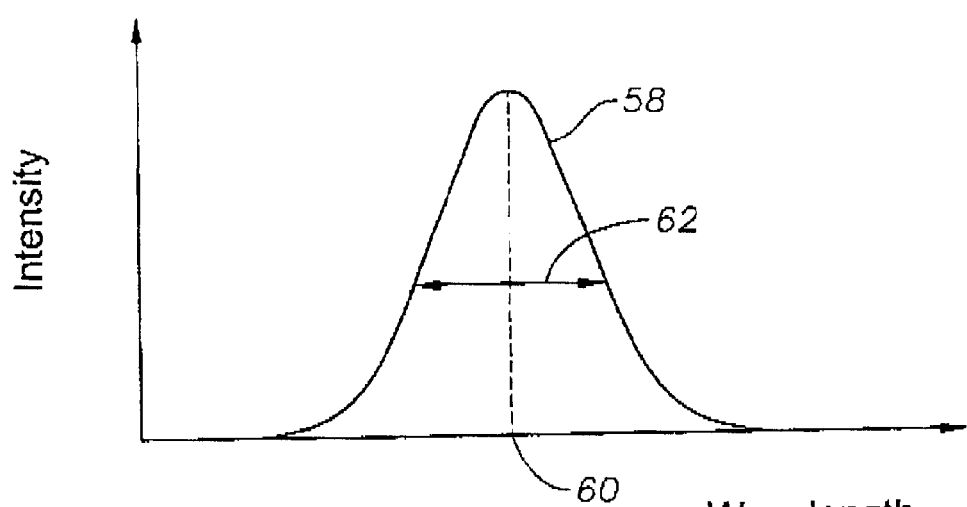
FIG. 5 is a schematic plot of a spectrum associated with the particle as shown in FIG. 1.

Referring now to FIG. 5, a plasmon resonance peak 58 preferably has a peak wavelength 60 and a peak width 62. Peak wavelength 60 is the wavelength at which plasmon resonance peak 58 has a maximum. Peak width 62 is herein defined as the full width half maximum of plasmon resonance peak 58. Peak width 62 may include contributions from both homogenous and inhomogeneous line broadening. Homogeneous line broadening occurs in part as a result of electron collisions. Peak width 62 then depends in part on the shell electron mean free path.

Peak wavelength 60 preferably is shifted from the peak wavelength of a colloidal particle made of the same material as the primary material forming shell 16. The shift is preferably a red-shift, that is a shift to larger wavelength. Peak wavelength 60 is preferably between about 300 nanometers and about 20 microns.

Gold and silver are exemplary metallic materials for use in shell 16 such that particle 10 has a plasmon resonance associated with shell 16. When shell 16 includes silver, nanoparticle 10 preferably has a plasmon resonance with a peak wavelength from about 400 nanometers to about 20 microns. In contrast, the peak wavelength for colloidal silver varies from about 390–420 nanometers depending on the size of the colloids, giving a solution of silver colloids a characteristic yellow color. Thus, when shell 16 contains silver, peak wavelength 60 is preferably red-shifted from colloidal silver. Similarly, when shell 16 includes gold, nanoparticle 10 preferably has a plasmon resonance with a peak wavelength greater than about 500 nanometers to about 20 microns. In contrast, the peak wavelength for colloidal gold varies from about 500–530 nanometers depending on the size of the colloids, giving a solution of gold colloids a characteristic red color. Thus, when shell 16 contains gold, peak wavelength 60 is preferably red-shifted from colloidal gold.

In some embodiments, shell 16 has a thickness less than the bulk electron mean free path of the primary material forming shell 16. When the thickness of shell 16 is greater than or equal to the bulk electron mean free path, that is the value of the mean free path in a bulk amount of the material forming shell 16, the shell electron mean free path is equal to the bulk electron mean free path. When the thickness of shell 16 is less than the bulk electron mean free path, the shell electron mean free path is equal to the thickness of shell 16. Thus, when the thickness of shell 16 is less than the bulk electron mean free path, size-dependent effects are present in the peak width 62.

A plurality of cores 15 and a plurality of particles 10 each is preferably substantially monodisperse. Further, inhomogeneous broadening in a plasmon resonance originating from a plurality of particles 10 may also occur in part due to polydispersity of particles 10. That is, inhomogeneous broadening may arise from variations in the size of particles 10. In a preferred embodiment, a plurality of cores 15 is characterized by a distribution of sizes with a standard deviation of up to about 20%, more preferably up to about 10%.

Referring again to FIG. 1, it will be understood that core 15 may alternately be an inner composite particle that includes a solid core and at least one shell. Further, it is contemplated that a particle, such as particles 10 may include a core and any number of metallic shells. A metallic shell may be layered upon another metallic shell. Alternatively, a pair of metallic shells is separated by a coating. In some embodiments, each shell is a conducting layer. Further, in some embodiments, each coating is a non-conducting layer. Exemplary non-conducting layers include dielectric materials. Alternatively or in combination, exemplary non-conducting layers include semi-conducting materials.

Methods for Making Partial Metal Nanoshells

A method for making a partial metal nanoshell preferably involves the addition of symmetry breaking to any suitable method for making isotropic metal nanoshells. Methods for making isotropic metal nanoshells are disclosed in U.S. patent applications: Ser. No. 09/038,377, filed Mar. 11, 1998 now U.S. Pat. No. 6,344,272; Ser. No. 09/755,229, filed Jan. 5, 2001 now pending; Ser. No. 09/966,544, filed Sep. 27, 2001 now pending; and Ser. No. 09/965,305, filed Sep. 27, 2001 now pending, and U.S. application Ser. No. 10/013258, entitled Multi-Layer Metal Nanoshells, filed concurrently herewith, which are each hereby incorporated herein by reference. Various of the embodiments described in these references are described below.

Making Isotropic Nanoshells

According to an embodiment of a process for making nanoshells, a method for making a nanoshell includes providing a silica core, and growing a gold shell on the silica core. The gold shell is grown on the silica core using aminopropyltriethoxysilane molecules to generate linker molecules that functionalize the core. Growth of the gold shell includes attaching gold colloidal particles to the linker molecules and reducing additional gold from solution onto the gold colloidal particles. Preferably the method is carried out in solution. The method preferably includes providing a solution of the gold colloidal particles. The method preferably further includes aging the solution of gold colloidal particles. The time period of aging is from about 5 to about 30 days, more preferably from about 7 to about 24 days, still more preferably from about 10 to about 20 days. The aging is preferably carried out under refrigeration, preferably at a temperature of about 40° F. (about 4° C.).

According to an embodiment of a process for making nanoshells, monodisperse silica cores are grown using the Stöber method, described in W. Stöber, et al. Journal of Colloid and Interface Science 26, pp. 62–69 (1968), hereby incorporated herein by reference. In particular, tetraethylorthosilicate (TEOS), ammonium hydroxide ($NH_4OH$), and water are added to a glass beaker containing ethanol, and the mixture is stirred overnight. The size of the Stöber particles is dependent on the relative concentrations of the reactants. These particles are then functionalized with 3-aminopropyltriethoxysilane (APTES). The 3-aminopropyltriethoxysilane (APTES) hydrolyzes to form a 3-aminopropylsilanetriol linker molecule. The silane group attaches to the silica surface, and the amine group is exposed.

It will be understood that alternative cores includes any core as described above in the section entitled Partial Metal Nanoshells. Further, alternative linker molecules that may be attached to the core to functionalize the core include any linker molecule as described above in the same section.

According to an embodiment of a process for making nanoshells, ultrasmall gold colloid (1–3 nm) is synthesized using a recipe reported by Duff, disclosed in D. G. Duff, et al., Langmuir 9, pp. 2310–2317 (1993) (Duff, et al.), hereby incorporated herein by reference. This entails, for example, a solution of 45 mL of water, 1.5 mL of 29.7 mM $HAuCl_4$, 300 uL of 1M NaOH and 1 mL (1.2 mL aqueous solution diluted to 100 mL with water) of tetrakishydroxymethylphosphoniumchloride (THPC). This gold is then added to the functionalized silica particles, preferably after aging as described above. The gold colloid attaches to the amine-terminated silica particles, which provide nucleation sites for the chemical deposition of a metallic shell.

It will be understood that, alternatively, any metal that can be made in colloidal form could be attached as a metal cluster. Alternative metal that may be used to form a partial shell include any suitable metals as described above in the section entitled partial metal nanoshells. For example, silver, platinum, palladium, lead, and the like may be used.

Further, according to an alternative embodiment of a process for making nanoshells, a method of making a metal nanoshells includes providing an intermediate layer of a functionalizing metal. The functionalizing metal is preferably tin. Alternatively, the functionalizing metal is titanium. Tin functionalization is described in U.S. patent application Ser. No. 09/965,305, filed Sep. 27, 2001 now pending. As disclosed therein, functionalization with gold colloid attached to a linker molecule attached to a substrate, as described above, may be replaced by tin functionalization, as described below. In this way, nanoshells each having a layer of a shell metal may be made by mixing tin ions and substrate particles in solution to form functionalized particles, followed by reduction of the shell metal onto the functionalized particles.

As further disclosed in U.S. patent application Ser. No. 09/965,305, filed Sep. 27, 2001 now pending, after separation from a reactant solution, such as by centrifugation, Stöber particles are redispersed in a first solvent and submerged in a solution of $SnCl_2$ in a second solvent. The first solvent may be water. Alternatively, and more preferably, the solvent is a methanol/water mixture, preferably 50% by volume methanol. Further, the second solvent may be water. Alternatively, and preferably the second solvent is a methanol/water mixture, preferably 50% by volume methanol. A solution of tin chloride in a methanol/water solvent preferably includes a surfactant, such as $CF_3COOH$. A method of tin functionalization using a methanol/water solvent is described, for example in Yoshio Kobayashi, et al. Chemical Materials 13, pp. 1630–1633 (2001), hereby incorporated herein by reference. By adding tin (II) chloride $SnCl_2$ and Stöber nanoparticles in a solvent, it is believed that tin atoms are deposited chemically onto the surface of the Stöber nanoparticles. Small tin precursor particles (<2 nm) form on the surface of the silica nanoparticle upon addition of more $SnCl_2$ to the solution. Presence of these tin particles have been observed by TEM, for example as described in Example 17 below.

As still further disclosed in U.S. patent application Ser. No. 09/965,305, filed Sep. 27, 2001 now pending, after a period of time, such as at least 45 minutes, the tin-functionalized silica particles are separated from solution and redispersed in water. The separation from solution is achieved on the lab bench scale by centrifugation. Centrifugation has the advantage of removing any excess tin and preparing the tin-coated nanoparticles for further metal reduction. When the functionalized particles are redisbursed in water the pH tends to be about 3. The pH is preferably modified, such as to at least 9 for subsequent reduction of silver. Modification of the pH has the advantage of achieving reaction conditions favorable for reduction of a shell metal.

Reduction of shell metal preferably includes included mixing a functionalized dielectric substrate, a plurality of metal ions, and a reducing agent, in solution. Formaldehyde is a preferred reducing agent. The metal may be any shell metal as disclosed above in the section entitled Multi-Layer Nanoshells.

When the metal is selected from among silver, copper, and nickel, as disclosed in Ser. No. 09/966,544, filed Sep. 27, 2001 now pending, the method preferably further includes raising the pH of the solution effective to coat the substrate with the metal. In particular, in one embodiment, as disclosed therein, gold-functionalized silica particles are mixed with 0.15 mM solution of fresh silver nitrate and stirred vigorously. A small amount (typically 25–50 microliters) of 37% formaldehyde is added to begin the reduction of the silver ions onto the gold particles on the surface of the silica. This step is followed by the addition of doubly distilled ammonium hydroxide (typically 50 micro-liters). The "amounts" or "relative amounts" of gold-functionalized silica and silver nitrate dictate the core to shell ratio and hence the absorbance. Before further use, the nanoshell solution is preferably centrifuged to separate the nanoshells from solution and thus remove byproducts and any solid silver colloid that formed. The nanoshells are preferably resuspended in a solvent. The solvent is preferably water. Alternatively, the solvent is ethanol. Centrifugation and resuspension may be repeated for a total number of cycles of preferably between 1 and 2.

Introduction of Asymmetry

Figure 6:
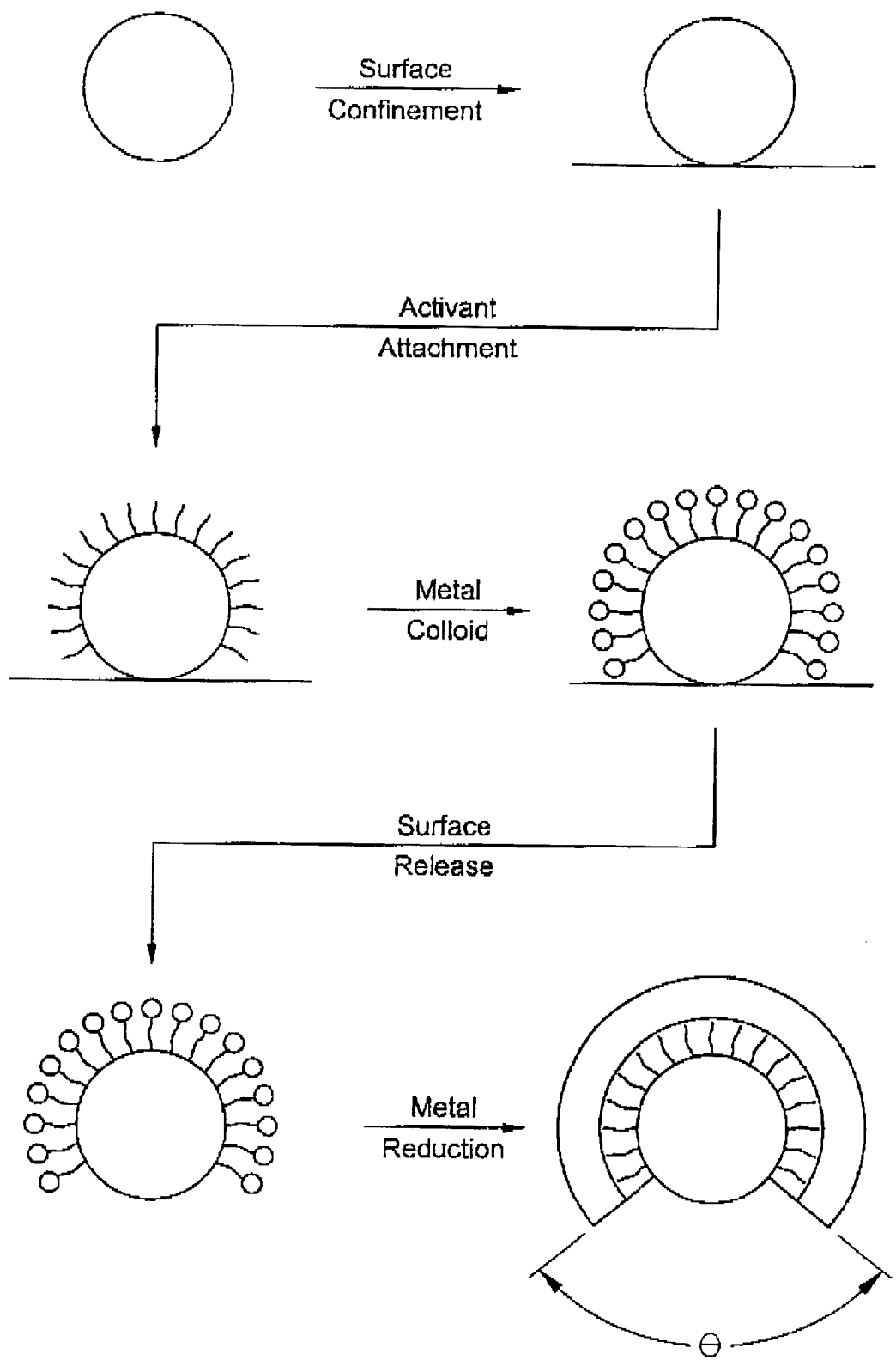
FIG. 6 is a schematic diagram of a reaction process according to an embodiment of the present invention.
Figure 7:
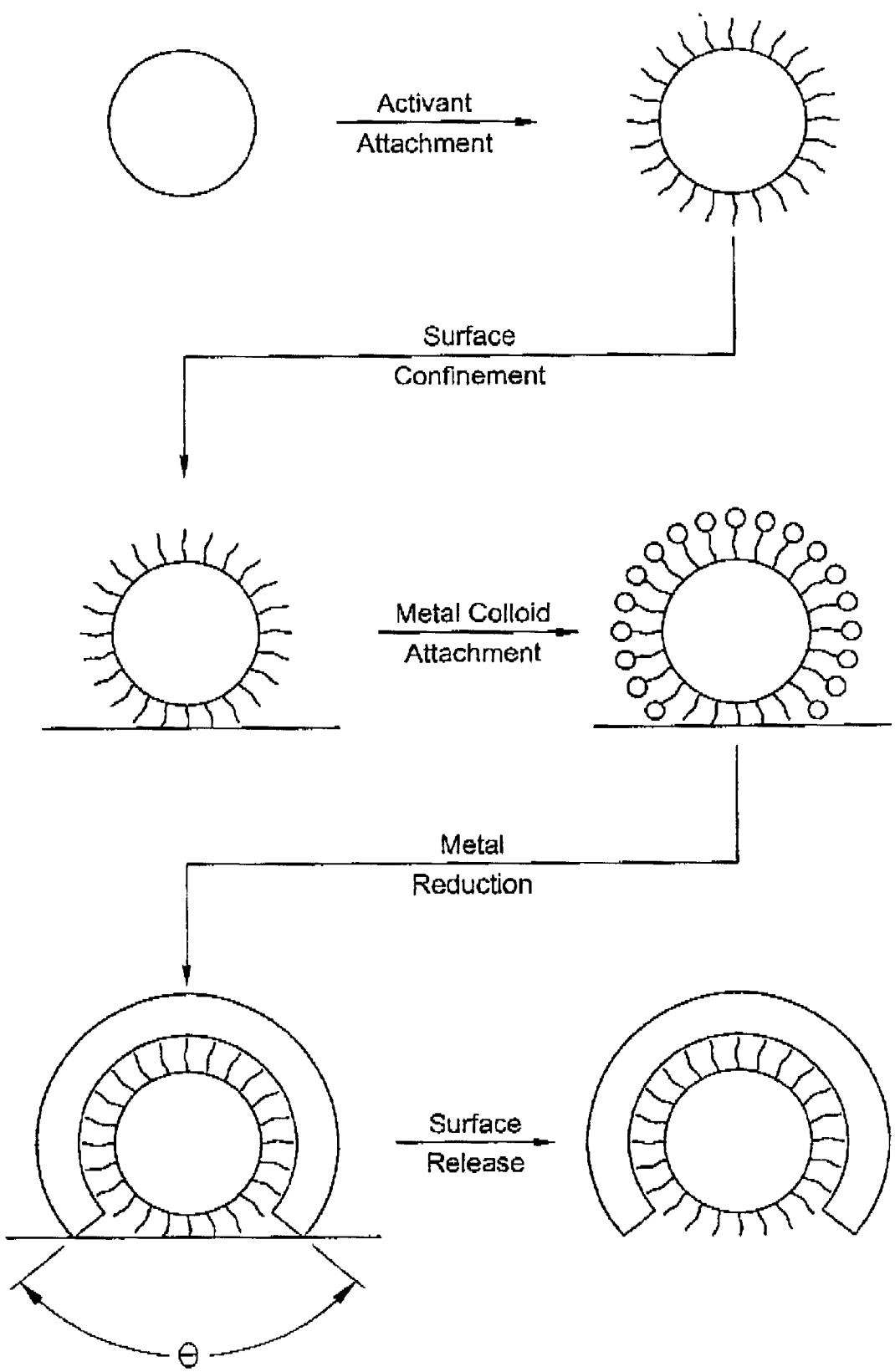
FIG. 7 is a schematic diagram of a reaction process according to an alternative embodiment of the present invention.
Figure 8:
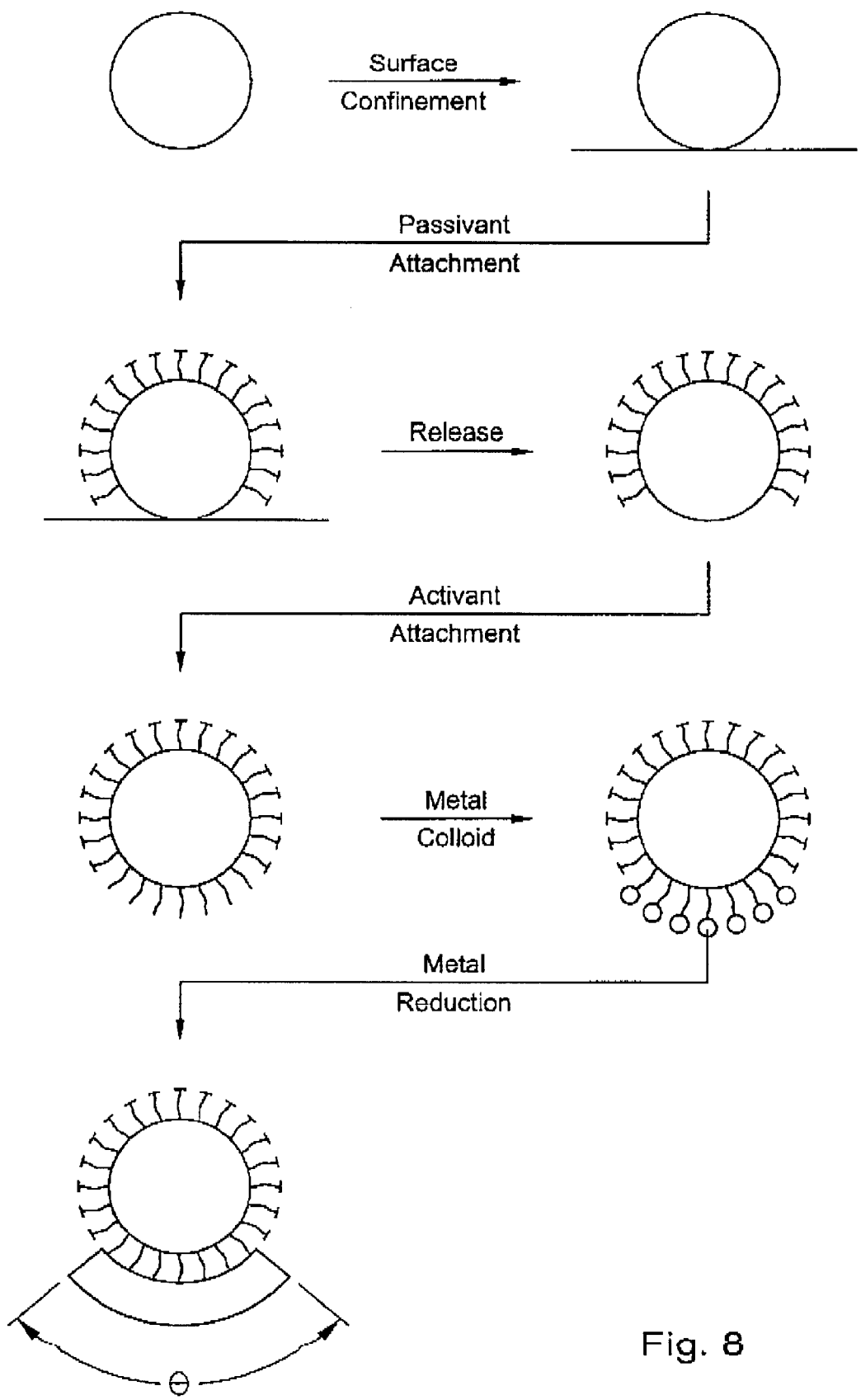
FIG. 8 is a schematic diagram of a reaction process according to yet an alternative embodiment of the present invention.

Asymmetry may be introduced into any one of the above-described processes at any suitable stage. For example, asymmetry may be introduces either before, as shown in FIG. 6, or after, as shown in FIG. 7, functionalizing a substrate particle, such as a core particle. The asymmetry is preferably introduced by confining the substrate particle, preferably mechanically. A method of making an asymmetric particle may further include release of the substrate particle. Release may also occur at any suitable stage. For example, release may occur either before, as shown in FIG. 6, or after, as shown in FIG. 7, reduction of metal onto a funtionalized substrate particle or metal colloids attached to a functionalized substrate particle. Further, in some embodiments it may be desirable to exclude a release step, leaving the asymmetric composite particles that are produced confined in position as during the production thereof. Still further, an exposed portion of a substrate particle may be either activated with an activating agent, thus functionalizing the exposed portion, as shown in FIGS. 6 and 7. It will be understood that an activating agent may be any linker molecule described herein. Alternatively, an exposed portion of a substrate particle may be passivated with a passivating agent, followed by activation of the remaining contact portion of the substrate particle, as shown in FIG. 8.

In an embodiment of the present invention, the fundamental strategy underlying the production of these asymmetric structures is the introduction of steric hindrance to the core particles to be metallized, by the uniform deposition of the cores onto a flat surface. These cores are attached to this surface in solution, and remain there during chemical functionalization. This attachment can be effected electrophoretically, by gravity, centrifugation, electrostatic attraction (e.g. between a nanoparticle and a charged support,) or by evaporative deposition. The percentage of steric hindrance to be introduced to the surface of the core nanoparticles can then be controlled, relative to the core diameter size, by altering the length and bulkiness of the silane-linker molecules that will attach the metal colloid. After the particles are deposited, preferably electrophoretically into a two-dimensional colloidal array onto a metallized-glass electrode, this silane-linker reagent may be reacted to the remainder of the core surface percentage that is exposed to solution. The electrode-particle interface sterically prevents attachment of the silane reagent where the particle is attached. After this, excess silane reagent may be rinsed from the particles, and then the cores are stripped from their electrode, most effectively by brief sonication, into ethanol. The nascent "bald-spots" can then be functionalized themselves by a different silane reagent, usually a passivating agent which resists attachment of metal colloid. At this point metal-colloid nanoparticles, ranging from 3–7 nanometers in diameter (depending on their age), are reacted with the cores, which attach to the regions where the amino silane-linker molecules exist on the particles. The particles can then be rinsed of excess reagent by centrifugation and redispersion in water or ethanol. Metallization can then be effected in solution, as in the case of the symmetric metal nanoshells, by reduction of metal onto the colloid islands.

Making Partial Gold Nanoshells with Silica Cores

In some embodiments, the core is a silica sphere and the metal is gold. Silica spheres are electrophoretically attached to a metallized glass slide in ethanol, for the purpose of providing steric hindrance to the regions of silica where colloid deposition is undesired. Silica spheres are electrophoretically attached to the metallized (in this case indium-tin oxide, or ITO) glass slides, by placing two slides in parallel-plate fashion of known separation into a solution of dilute stober particles in ethanol. A voltage is then applied across the slides to attach the stober particles to one of the slide surfaces.

At this point, either activating (3-aminopropyltriethoxysilane, or APTES) or passivating (propyltrimethoxysilane, or PTMS) reagents can be added to solution to induce or prevent gold colloid deposition upon the surfaces of the silica spheres. Thus, two variations on the method are then possible: functionalizing the exposed silica sphere surface with colloid, and leaving a "bald spot" due to steric hindrance from the sphere-glass slide interface; or passivating the exposed sphere surface to colloid deposition, and activating the sterically induced "bald spot" to colloid deposition. Gold colloid particles ranging from 5–50 nm sizes can then be attached to the surfaces where the activating agent is present, and the desired particles can be concentrated by evaporative or centrifugal methods. Partial gold shells can then be grown over the colloid-covered regions of the spheres.

In the former variation, the glass slide assembly is removed from the dilute stober solution and placed into a solution containing a known concentration of the activating agent, APTES, and reacted for a known amount of time, under the same voltage used to attach them to the slide. Then the slide assembly is removed from the activating solution, the voltage is reduced to 0.9 Volts (a potential which avoids hydrolysis of aqueous solutions), and the assembly is inserted into an aqueous gold colloid solution. Gold colloid deposition is allowed to occur for over 8 hours. Then, the slide containing the desired end-product is removed from the assembly, placed in fresh ethanol, and stripped by bath-sonication for 10 minutes, at which point the ethanol solution can be further concentrated by centrifugation, or diluted. Finally, gold nanoparticles in solution can be reduced onto the gold colloid regions by use of a reducing agent, such as formaldehyde or sodium borohydride.

The latter variation, the glass slide assembly is removed from the dilute stober solution and placed into a solution of known concentration of the passivating agent, PTMS, and reacted for a known amount of time, at the electrophoretic attachment voltage. Then the assembly is dipped into a series of ethanol rinse solutions, with the voltage on, to rinse away excess PTMS. Then the slide containing the stober is removed from the assembly, and inserted into a test tube containing fresh ethanol, and stripped by bath-sonication for 10 minutes. Then the slide is removed, and a known amount of activating agent, APTES, is added to the ethanol solution, to activate the "bald spots" not passivated due to steric hindrance when they were still attached to the slide. The activation step proceeds for a prescribed amount of time, and then the stobers are centrifuged out of the activating solution, and redispersed in fresh ethanol twice, to rinse them of excess APTES. After the second rinse step, the rinse ethanol supernatant is poured off, and a known concentration of aqueous gold colloid solution is added to the pellet. This colloid is allowed to deposit onto the activated "bald spots" for over 8 hours. Then the product is again centrifuged to remove from the gold colloid solution, and redispersed in an amount of fresh ethanol that depends on the desired concentration of end-product. Gold nanoparticles in solution can finally be reduced onto the gold colloid regions by use of a reducing agent, such as formaldehyde or sodium borohydride.

Disadvantages to the processes described above can be low quantities of end-product due to limited surface areas of glass slides, and losses due to numerous rinsing steps throughout the procedures.

Both variations listed above are useful for altering the radius of coverage of the stober particles. Different attachment voltages and stober solution concentrations can be modified to control slide attachment properties. Slide surface-areas can be increased to increase yields of raw product. Stober particle diameter and gold colloid particle sizes can be altered to control degrees of steric hindrance. Relative concentrations of activating agents vs. passivating agents can control uniformity and quality of colloid coverage within the radius of coverage. Adjustment of slide attachment parameters seem most important in controlling the ratios of desired end-product to improperly functionalized product.

The asymmetrically covered nanoparticles produced by this method may have nonlinear optical properties (for optical mixing or modulating). Alternatively, they may have enhanced magnetic properties, if metallized with a magnetic metal such as Ni, Co, or Fe.

Without further elaboration, it is believed that one skilled in the art can, using the description herein, utilize the present invention to its fullest extent. The following specific embodiments are to be construed as illustrative and not as constraining the scope of the present invention in any way whatsoever.

EXAMPLES

Deposition of the dielectric cores was accomplished by electrophoretic deposition. Two slides were placed together in parallel-plate fashion, and stober cores, which possess a negative charge under pH 7 conditions in pure ethanol, were deposited by application of a low voltage. Electrophoretic deposition voltages and times were calibrated by viewing loaded slides under ESEM microscopy. Depending on the number of two-dimensional layers desired, voltages and times ranged from 1–3V and 1–3 min respectively.

After adequate deposition, this slide apparatus was removed from the stober solution, and inserted into the silane-linker reagent solution, while the voltage was still present across the slide apparatus. The linker reagent was allowed to either passivate or activate the exposed surfaces of the stobers for a prescribed amount of time. If the linker molecule was a passivant (e.g., n-propyltrimethoxysilane), then the exposed surfaces were not metallized. An activant (e.g., 3-aminopropyltriethoxysilane), on the other hand, attached to gold colloid. Either reagent was hydrolyzed readily by the stober particles at reagent concentrations of 12 $\mu$L activant/passivant per mL EtOH, when allowed to react for 30 minutes at room temperature. After this, the slide apparatus was removed, and quickly dipped into a fresh tube of pure ethanol, to rinse off excess activant or passivant. Then, the slide loaded with the particles, the (+) slide, was removed, inserted into a fresh bath of ethanol, and bath-sonicated for 30 seconds, to strip the particles from its surface. To this solution (approximately 2–3 mL EtOH), was added 5 $\mu$L of either activant/passivant (the opposite of that used to functionalize the exposed surfaces previously). This allowed the "bald spots" due to steric hindrance to be functionalized with a silane agent opposite that functionalized about the rest of the particle surface. This resulted in an asymmetric surface tailoring of the individual particles, which produced differing affinities for gold colloid once it is blended with them in solution.

The particles were then centrifuged down (200 rcf, 20 min; a speed which will change depending on the actual diameter of stober particles being functionalized) to rid them of excess activant/passivant, and then they were redispersed in the aqueous gold colloid solution (1 mL of THPC gold colloid solution), and allowed to react for 8 hrs. THPC, or tetrakishydroxymethylphosphonium chloride, was used as a reductant that allows for small gold nanoparticles of 3–7 nm to be grown, under refrigeration more than for 2 weeks, as reported by Duff, et al., incorporated by reference herein. Excess gold colloid was then removed by centrifugation and redispersion cycles, and particles were examined by TEM microscopy for quality of coverage. The present inventors believe that, based on the successful coverage seen under the given reaction conditions, the nanoparticles may concentrated down (for example into 5 aliquots of 100–1000 µL each, but all of the same particle concentration), and metallized.

The present inventors believe that metallization may be effected by adding each aliquot to 8 mL of aqueous $K_2CO_3$/$HAuCl_4$ solution, and then adding 5–20 µL of 37% formaldehyde. This may allow gold cations to preferentially reduce onto the surfaces of the colloid islands on the nanoparticles, which should quickly coalesce into a uniform gold layer in the regions of the islands. It is believed that attachment of alkyl groups to any remaining exposed linker molecules prior to reduction will prevent premature coalescence of gold colloid, facilitating reduction of gold onto controlled regions of the nanoparticle as defined by the symmetry breaking.

An advantage of the exemplary methods described is that gold layers grow only in the regions where the activant was allowed to react with the cores, and not encroach upon the areas where the passivant occupies particles. Using this methodology, if the "bald spots" are passivated, metallization would not take place in the region excluding the small circular passivated region, forming a "nanocup". Or, if the bald spots were activated, and the rest of the particle passivated, metallization can take place only on that small circular region, to produce a "nanocap".

Figure 9A:
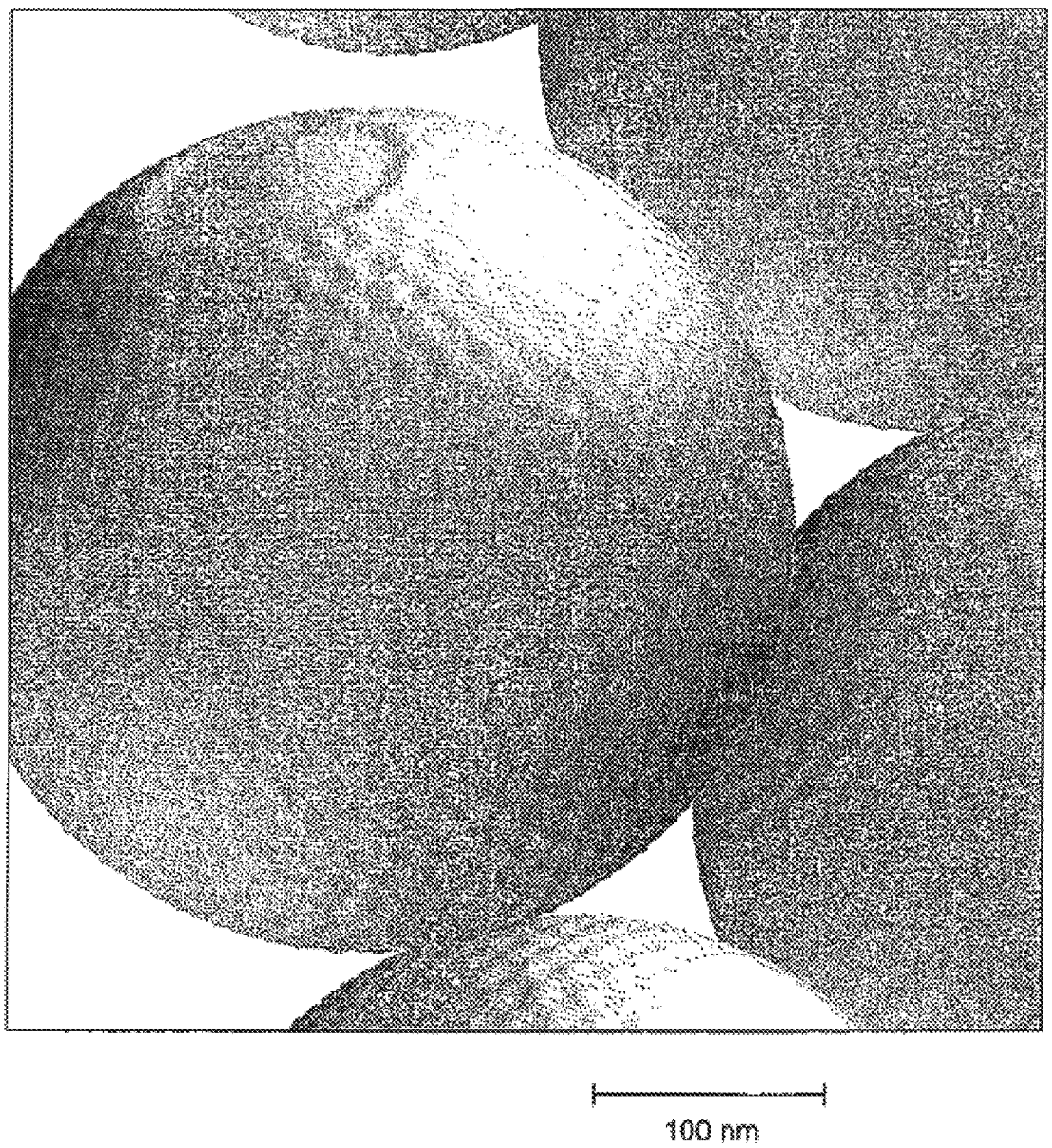
FIG. 9A includes exemplary TEM images of gold colloids attached to silica substrate particles with coverage at least 180°.
Figure 9B:
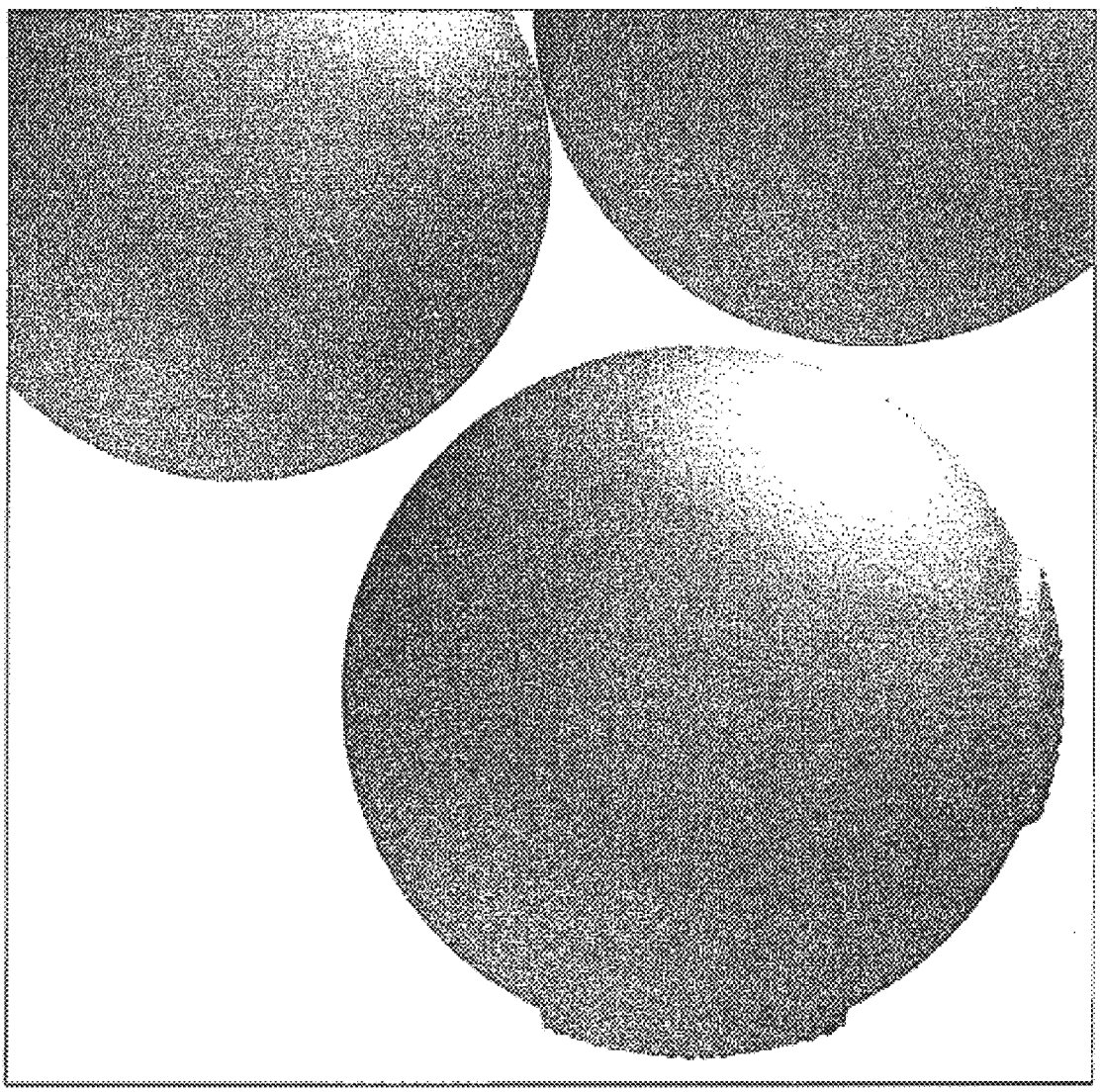
FIG. 9B includes exemplary TEM images of gold colloids attached to silica substrate particles with coverage less than 180°.
Figure 10:
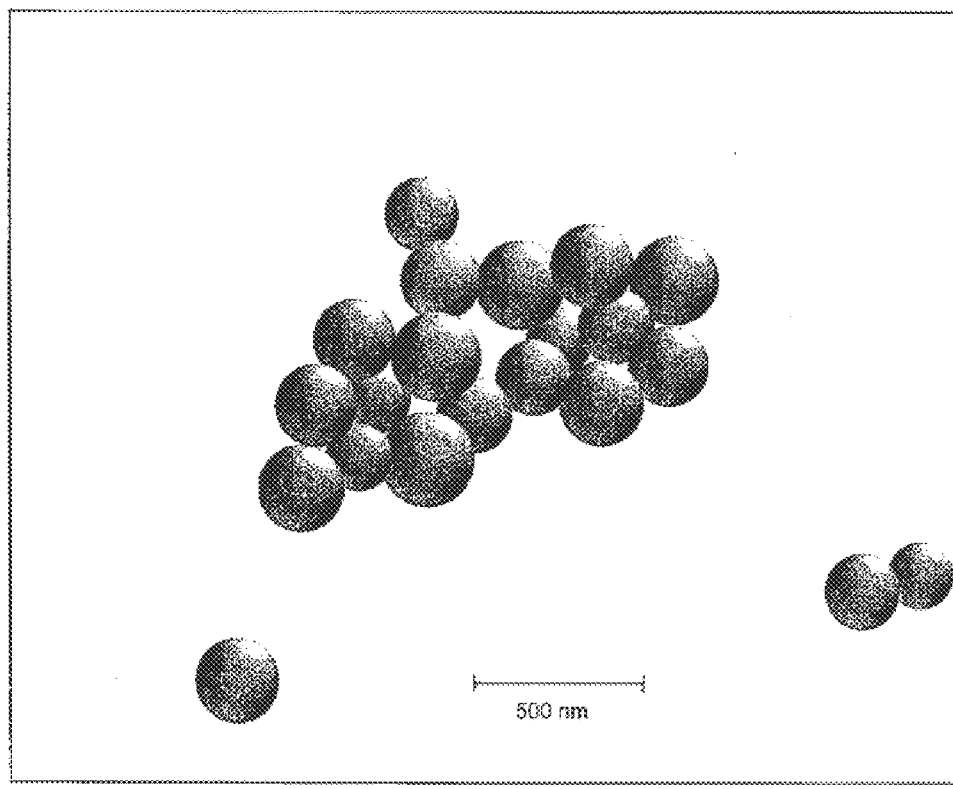
FIG. 10 includes exemplary SEM images of partial gold shells covering silica substrate particles.

Both types of particles were viewed by TEM microscopy, as shown, for example, in FIG. 9. It was observed that thicker multilayers allow only upper layers of cores to be exposed to the linker-reagent in solution. Therefore, after the slides were stripped and refunctionalized with the second silane reagent, the lower layer cores tended to be free to be fully reacted in solution, producing a null-product particle and thereby reducing percent yield. A slide sub-monolayer coverage tended to improve the percent yield, but resulted in lower total counts of particles, and might be expected to allow for roll-around on the electrode (thus exposing and destroying the desired bald spot). It has been observed that attaching gold colloid while the cores were attached tends to preserve the bald spot, indicating a tendency to prevent any roll-around. Further, partial shells were formed when additional gold was reduced onto the gold colloid. These were viewed by SEM microscopy, as shown, for example, in FIG. 10, in which the bald spots are seen as darker and the partial shell is seen as lighter.

While preferred embodiments of this invention have been shown and described, modifications thereof can be made by one skilled in the art without departing from the spirit or teaching of this invention. The embodiments described herein are exemplary only and are not limiting. For example, unless otherwise indicated, the steps of a method may occur in any order. Many variations and modifications of the composition and method are possible and are within the scope of the invention. Accordingly, the scope of protection is not limited to the embodiments described herein, but is only limited by the claims that follow, the scope of which shall include all equivalents of the subject matter of the claims.

What is claimed is:

1. A method for making an asymmetric composite nanoparticle, comprising:
   a) asymmetrically confining a substrate nanoparticle so as to define a first surface portion and a second surface portion;
   b) selectively layering a primary metallic material over one of the first surface portion and the second surface portion so as to form a partial metal shell comprising the primary metallic material.

2. The method according to claim 1 wherein step (a) comprises reversibly attaching the substrate nanoparticle to a support.

3. The method according to claim 2 wherein the substrate nanoparticle is attached such that the first surface portion contacts the support and the second surface portion is fully exposed.

4. The method according to claim 2 where step (a) comprises electrophoretically attaching the substrate nanoparticle to the support.

5. The method according to claim 4 wherein the support comprises a base and a metallizing coating.

6. The method according to claim 5 wherein the metallizing coating comprises titanium dioxide.

7. The method according to claim 5 wherein the base comprises glass.

8. The method according to claim 5 wherein the base comprises plastic.

9. The method according to claim 3 wherein step (a) comprises evaporatively depositing the substrate nanoparticle on the support.

10. The method according to claim 3 wherein step (a) comprises gravitationally attaching the substrate nanoparticle to the support.

11. The method according to claim 3 wherein step (a) comprises centrifugally attaching the substrate nanoparticle to the support.

12. The method according to claim 3 wherein step (a) comprises electrostatically attaching the substrate nanoparticle to the support.

13. The method according to claim 1 wherein step (b) comprises attaching a plurality of colloids comprising a precursor metallic material to one of the first surface portion and the second surface portion.

14. The method according to claim 13 wherein the precursor metallic material and the primary metallic material are chemically identical.

15. The method according to claim 13 wherein the precursor metallic material and the primary metallic material are chemically distinct.

16. The method according to claim 13 wherein step (b) comprises reducing the primary metallic material onto the colloids.

17. The method according to claim 1 wherein step (b) comprises reducing the primary metallic material directly onto one of the first surface portion and the second surface portion.

18. The method according to claim 1 wherein the primary metallic material is selected from the group consisting of elemental metals, alloys, and synthetic metals.

19. The method according to claim 18 wherein the primary metallic material is selected from the group consisting of gold, silver, platinum, palladium, iron, nickel, and copper.

20. The method according to claim 1 further comprising:
   c) chemically modifying the substrate nanoparticle so as to form an activated portion.

21. The method according to claim 20 wherein the activated portion comprises the whole surface of the substrate nanoparticle and where step (c) precedes step (a).

22. The method according to claim 20 wherein the activated portion comprises one of the first surface portion and the second surface portion and step (c) follows step (a) and precedes step (b).

23. The method according to claim 20 wherein step (c) comprises binding a plurality of activating agents to one of the first surface portion and the second surface portion.

24. The method according to claim 23 wherein step (c) further comprises binding a plurality of passivating agents to the other of the first surface portion and the second surface portion.

25. The method according to claim 23 wherein each activating agent comprises a functionalizing metal atom selected from the group consisting of tin and titanium.

26. The method according to claim 23 wherein each activating agent comprises a functionalizing nonmetallic compound selected from the group consisting of CdSe and CdS.

27. The method according to claim 23 wherein the substrate nanoparticle comprises silica and each activating agent comprises an aminoalkysilanetriol.

28. The method according to claim 27 wherein step (c) further comprises binding a plurality of passivating agents to the other of the first surface portion and the second surface portion.

29. The method according to claim 28 wherein substrate nanoparticle comprises silica and each passivating agent comprises an alkylsilanetriol.

30. The method according to claim 28 wherein the substrate nanoparticle comprises silica and each passivating agent comprises a trialkylsilanol.

31. The method according to claim 1 wherein the substrate nanoparticle comprises a substrate material selected from the group consisting of silicon dioxide, titanium dioxide, polymethyl methacrylate, polystyrene, gold sulfide, cadmium selenium, cadmium sulfide, gallium arsenide, and dendrimers.

32. A method for making an asymmetric composite nanoparticle, comprising:
 a) electrophoretically attaching a core nanoparticle to a metallized support such that the core nanoparticle has an exposed portion and a remaining portion;
 b) selectively attaching a plurality of activating agents to either the exposed portion or the remaining portion;
 c) depositing a plurality of metal colloids onto the activating agents; and
 d) reducing additional metal onto the metal colloids so as to form a partial metal shell.

33. The method according to claim 32 wherein step (b) comprises:
 b1) attaching a plurality of activating agents to the exposed portion.

34. The method according to claim 32 wherein step (b) comprises:
 b1) attaching a plurality of passivating agents to the exposed portion of the nanoparticle;
 b2) detaching the nanoparticle from the metallized support; and
 b3) attaching a plurality of activating agents to the remaining portion of the nanoparticle.

35. A method for making a nonuniform composite nanoparticle, comprising:
 a) immobilizing a substrate nanoparticle against a surface defining a contact region and a corresponding exposed region;
 b) chemically modifying the exposed region; and
 c) selectively forming a partial metal layer over either the contact region or the exposed region as determined by the nature of the modification in step (b).

36. The method according to claim 35 wherein step (b) comprises activating the exposed region for receipt of the metal.

37. The method according to claim 35 wherein step (b) comprises passivating the exposed region and step (c) further comprises activating the contact region for receipt of the metal.

38. An asymmetric composite nanoparticle comprising:
 a substrate nanoparticle; and
 a partial metal shell layered on said substrate nanoparticle within a solid angle less that 360°.

39. The composite nanoparticle according to claim 38 wherein said solid angle is at least 180°.

40. The composite nanoparticle according to claim 38 wherein said solid angle is less than 180°.

41. The composite nanoparticle according to claim 38 wherein the nanoparticle has a plasmon resonance associated with said metallic shell.

42. The composite nanoparticle according to claim 38 wherein the nanoparticle is magnetic.

43. The composite nanoparticle according to claim 38 wherein said nanoparticle is made by a method comprising:
 a) asymmetrically confining said substrate nanoparticle so as to define a first surface portion and a second surface portion;
 b) selectively layering a primary metallic material over one of the first surface portion and the second surface portion so as to form said partial metal shell.

44. The composite nanoparticle according to claim 43 wherein said composite nanoparticle comprises a nanocup.

45. The composite nanoparticle according to claim 43 wherein said composite nanoparticle comprises a nanocap.

* * * * *